United States Patent
Taru et al.

(10) Patent No.: US 9,128,233 B2
(45) Date of Patent: Sep. 8, 2015

(54) MULTI-CORE FIBER

(71) Applicant: SUMITOMO ELECTRIC INDUSTRIES, LTD., Osaka-shi, Osaka (JP)

(72) Inventors: Toshiki Taru, Yokohama (JP); Takuji Nagashima, Yokohama (JP); Eisuke Sasaoka, Yokohama (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 165 days.

(21) Appl. No.: 13/863,650

(22) Filed: Apr. 16, 2013

(65) Prior Publication Data

US 2013/0287347 A1 Oct. 31, 2013

(30) Foreign Application Priority Data

Apr. 25, 2012 (JP) ................... 2012-100200

(51) Int. Cl.
*G02B 6/02* (2006.01)
(52) U.S. Cl.
CPC .................. *G02B 6/02042* (2013.01)
(58) Field of Classification Search
CPC .................................. G02B 6/02042
See application file for complete search history.

(56) References Cited

U.S. PATENT DOCUMENTS

2011/0182557 A1    7/2011    Hayashi
2011/0222828 A1    9/2011    Sasaoka et al.

FOREIGN PATENT DOCUMENTS

| EP | 2 369 376 A2 | 9/2011 |
| EP | 2 369 376 A3 | 10/2012 |
| JP | 07-209563 A | 8/1995 |
| JP | 10-39185 A | 2/1998 |
| JP | 2002-202446 A | 7/2002 |
| JP | 2003-021763 A | 1/2003 |
| JP | 2011-209702 A | 10/2011 |
| WO | WO 02/090275 A2 | 11/2002 |
| WO | WO 02/090275 A3 | 11/2002 |

OTHER PUBLICATIONS

T. Tjugiarto, et al., "Bandpass Filtering Effect in Tapered Asymmetrical Twin-Core Optical Fibres," Electronics Letters, vol. 29, No. 12, Jun. 10, 1993, pp. 1077-1078.
Masanori Koshiba et al., "Heterogeneous multi-core fibers: proposal and design principle," IEICE Electronics Express, 2009, pp. 98-103, vol. 6, No. 2.

*Primary Examiner* — Jerry Rahll
(74) *Attorney, Agent, or Firm* — Drinker Biddle & Reath LLP

(57) ABSTRACT

There is provided a multi-core fiber that can reduce both skew and crosstalk between cores. The multi-core fiber includes a plurality of cores extending along a fiber axis, and optical claddings surrounding the plurality of cores. The skew between optical signals propagating through the plurality of cores is 1 ps/m or less, and the propagation constant difference between two adjacent cores of the plurality of cores is more than 0.

12 Claims, 11 Drawing Sheets

MULTI-CORE FIBER

BACKGROUND OF THE INVENTION

1. Field of the Invention

The present invention relates to a multi-core fiber.

2. Description of the Related Art

For a multi-core fiber including a plurality of high refractive index portions (cores) extending along a fiber axis, there is a demand that a skew between optical signals propagating through the cores (a time gap caused by passages through a plurality of paths) is small. The skew between the cores sometimes results from the length difference between the cores, and sometimes results from the structure difference between the cores. If the skew between the cores is large, a problem is caused in parallel optical transmission using a plurality of cores. An optical fiber ribbon is also sometimes required to reduce the skew between optical fibers. Inventions regarding this skew reduction are disclosed in Japanese Unexamined Patent Application Publication Nos. 10-39185 and 2003-21763. However, a method capable of more easily reducing the skew is required. Further, since the optical fiber ribbon has a large cross-sectional area, it is preferably improved for higher density.

A multi-core fiber is superior to an optical fiber ribbon in that the skew resulting from the core length difference is small. Also, the multi-core fiber is superior in density. However, it is demanded that not only the skew between the cores but also crosstalk between the cores is reduced in the multi-core fiber. Japanese Unexamined Patent Application Publication No. 2011-209702 and IEICE Electronics Express, Vol. 6, No. 2, pp. 98-103 (NPR 1) describe techniques intended to reduce the crosstalk between cores in a multi-core fiber. These references describe that it is effective to make the propagation constant different between the cores in order to reduce the crosstalk between the cores in the multi-core optical fiber.

SUMMARY OF THE INVENTION

Accordingly, it is an object of the present invention to provide a multi-core fiber that can reduce both the skew and crosstalk between cores.

To achieve the object, a multi-core fiber according to an aspect of the present invention includes a plurality of cores extending along a fiber axis, and optical claddings surrounding the plurality of cores. A skew between optical signals propagating through the plurality of cores is 1 ps/m or less, and a propagation constant difference between two adjacent cores of the plurality of cores is more than 0. The propagation constant difference is preferably more than $1 \times 10^{-5}$, and more preferably more than $1 \times 10^{-4}$.

Preferably, both a refractive index difference $\Delta n$ and a diameter are different between the two adjacent cores of the plurality of cores, and the skew between the optical signals propagating through the plurality of cores may be less than a skew realized in a case where the diameter is equal and only the refractive index difference is different between the cores and a skew realized in a case where the refractive index difference is equal and only the diameter is different between the cores for the same propagation constant difference. Here, the refractive index difference $\Delta n$ is given by $$\frac{n_{core}^2 - n_{cladding}^2}{2n_{core}^2}.$$

Alternatively, both a refractive index difference and a diameter are different between the two adjacent cores of the plurality of cores, and a core structure change parameter $\Delta(\Delta n)/\Delta(2a)$ may be negative when $\Delta(\Delta n)$ represents a change amount of the refractive index difference between the cores and $\Delta(2a)$ represents a change amount of the diameter between the cores, where $\Delta(\Delta n)$ is expressed by percent and $\Delta(2a)$ is expressed by micrometer.

In these cases, preferably, the propagation constant difference between the two adjacent cores of the plurality of cores is 0.0003/μm or more and the skew between the optical signals propagating through the plurality of cores is 0.1 ps/m or less. Preferably, the plurality of cores are formed of pure silica glass, and the optical claddings are formed of silica glass containing fluorine. Further, the plurality of cores may be formed of silica glass containing $GeO_2$, and the core structure change parameter $\Delta(\Delta n)/\Delta(2a)$ may be within a range of $-1.5 \times 10^{-2}$ to $-0.55 \times 10^{-2}$. Alternatively, the plurality of cores may be formed of pure silica glass, the optical claddings may be formed of silica glass containing fluorine, and the core structure change parameter $\Delta(\Delta n)/\Delta(2a)$ may be within a range of $-7.3 \times 10^{-2}$ to $-3.8 \times 10^{-2}$.

The plurality of cores may be formed of pure silica glass, the optical claddings may be formed of silica glass containing fluorine, and the skew between the optical signals propagating through the plurality of cores may be 0.5 ps/m or less. A refractive index depressed region having a refractive index lower than a refractive index of the optical claddings may be provided between the two adjacent cores of the plurality of cores.

An optical cable for parallel optical transmission according to another aspect of the present invention includes a multi-core fiber including a plurality of cores extending along a fiber axis and optical claddings surrounding the plurality of cores, and pigtail optical fibers optically connected to the cores of the multi-core fiber. The pigtail optical fibers are optically connected at one end to the cores of the multi-core fiber, and are separated into single cores at the other end. The skew of the multi-core fiber is compensated by connecting, to the core of the plurality of cores that provides a comparatively large delay, the pigtail optical fiber of the pigtail optical fibers whose separated portion at the other end is comparatively short. The total skew of the optical cable is 0.1 ps/m or less.

According to the present invention, it is possible to reduce both the skew and crosstalk between the cores.

DESCRIPTION OF THE PREFERRED EMBODIMENTS

Figure 1:
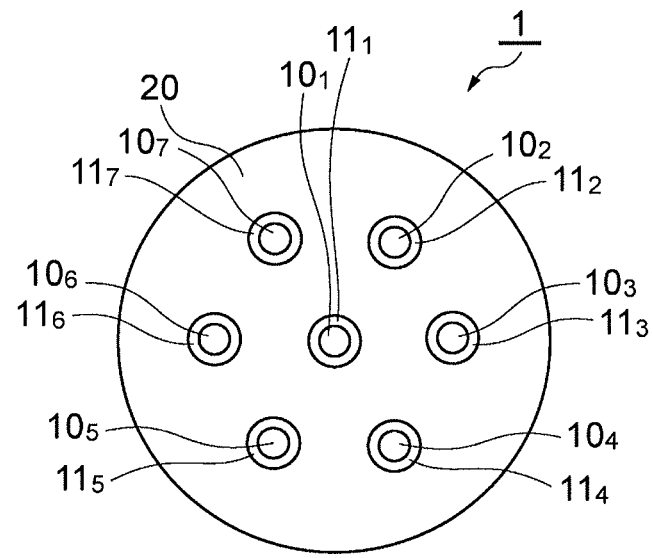
FIG. 1 is a cross-sectional view of an example of a multi-core fiber.

Embodiments of the present invention will be described in detail below with reference to the attached drawings. In the description of the drawings, same components are denoted by identical reference numerals, and redundant descriptions thereof are skipped.

In the design of NPR 1 for reducing crosstalk between cores, the refractive index structure is purposely made different between the cores, and this causes a skew between the cores. In the examples illustrated in FIGS. 3(a) and 3(b) of NPL 1, the diameters of all cores are fixed at 9 μm, and the refractive index difference of the cores is any of three values (0.38%, 0.39%, and 0.40%). In this case, the skew between the cores is estimated at 1.1 ps/m at a wavelength of 1.31 μm, 1.1 ps/m at a wavelength of 1.55 μm, and 1.2 ps/m at a wavelength of 1.625 μm.

In the examples illustrated in FIGS. 3(c) and 3(d) of NPL 1, the diameters of all cores are fixed at 5 μm, and the refractive index difference of the cores is any of three values (1.15%, 1.20%, and 1.25%). In this case, the skew between the cores is estimated at 5.7 ps/m at a wavelength of 1.31 μm, 5.9 ps/m at a wavelength of 1.55 μm, and 6.0 ps/m at a wavelength of 1.625 μm.

FIG. 1 is a cross-sectional view of an example of a multi-core fiber. In a multi-core fiber 1, seven cores $10_1$ to $10_7$ extending along a fiber axis are covered with optical claddings $11_1$ to $11_7$, respectively. Seven pairs of cores $10_m$ and optical claddings $11_m$ are covered with a jacket 20. Here, m represents integers 1 to 7. The optical cladding $11_m$ and the jacket 20 have the same refractive index. In a cross-section of the multi-core fiber 1 perpendicular to the fiber axis, the core $10_1$ is located at the center, and the other six cores $10_2$ to $10_7$ are arranged at regular intervals on a circumference of a circle centered on the core $10_1$. Each of the cores $10_1$ to $10_7$ has a refractive index higher than that of the optical cladding that covers the core, and can guide waves of light.

Figure 2:
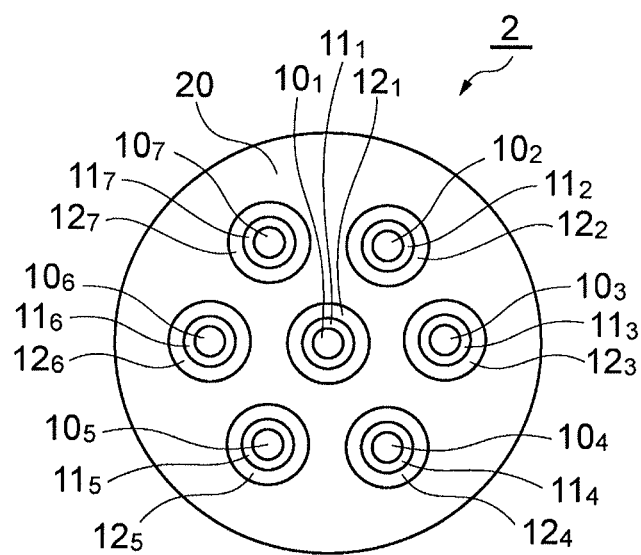
FIG. 2 is a cross-sectional view of another example of a multi-core fiber.

FIG. 2 is a cross-sectional view of another example of a multi-core fiber. In a multi-core fiber 2, seven cores $10_1$ to $10_7$ extending along a fiber axis are covered with optical claddings $11_1$ to $11_7$ and refractive index depressed regions $12_1$ to $12_7$, respectively. Seven combinations of the core $10_m$, the optical cladding $11_m$, and the refractive index depressed region $12_m$ are covered with a jacket 20. In the multi-core fiber 2, m also represents integers 1 to 7. In a cross section of the multi-core fiber 2 perpendicular to the fiber axis, the core $10_1$ is located at the center, and the other six cores $10_2$ to $10_7$ are arranged at regular intervals on a circumference of a circle centered on the core $10_1$. Each core $10_m$ has a refractive index higher than that of the optical cladding $11_m$ surrounding the core, and can guide waves of light.

Each refractive index depressed region $12_m$ surrounding the corresponding optical cladding $11_m$ has a refractive index lower than those of the optical cladding $11_m$ and the jacket 20. Since the refractive index depressed region is provided between two adjacent cores, crosstalk between the cores is reduced. Also, the core-to-core distance can be decreased, and this can achieve higher density. Further, the bending loss is reduced, and handleability is enhanced.

In the following, a case in which cores are formed of silica glass containing $GeO_2$ and optical claddings are formed of pure silica glass will be described as a first embodiment, and a case in which cores are formed of pure silica glass and optical claddings are formed of silica glass containing fluorine will be described as a second embodiment. In any of these embodiments, each of the cores is a single-mode core having a simple step-index refractive index profile. Further, 2a represents the core diameter (unit: μm), Δn represents the refractive index difference $$\frac{n_{core}^2 - n_{cladding}^2}{2n_{core}^2} \times 100$$

(unit: %), S represents the skew between the cores (unit: ps/m), and Δβ represents the propagation constant difference (unit: 1/μm).

First Embodiment

In a multi-core fiber according to a first embodiment, cores are formed of silica glass containing $GeO_2$, optical claddings are formed of pure silica glass, and the propagation constant is different between two adjacent cores so as to suppress crosstalk. The skew in the multi-core fiber is a group delay difference between signals propagating through different cores, and is given as a delay time difference per unit length. The skew in the multi-core fiber is caused by the difference in the refractive index structures such as the core diameter $2a$ and the refractive index difference $\Delta n$. In the following, a condition in which the core diameter $2a$ is 8.5 μm and the refractive index difference $\Delta n$ is 0.35% is set as a reference condition, and the skew and propagation constant difference are calculated as differences from the group delay and propagation constant in the reference condition.

Figure 3:
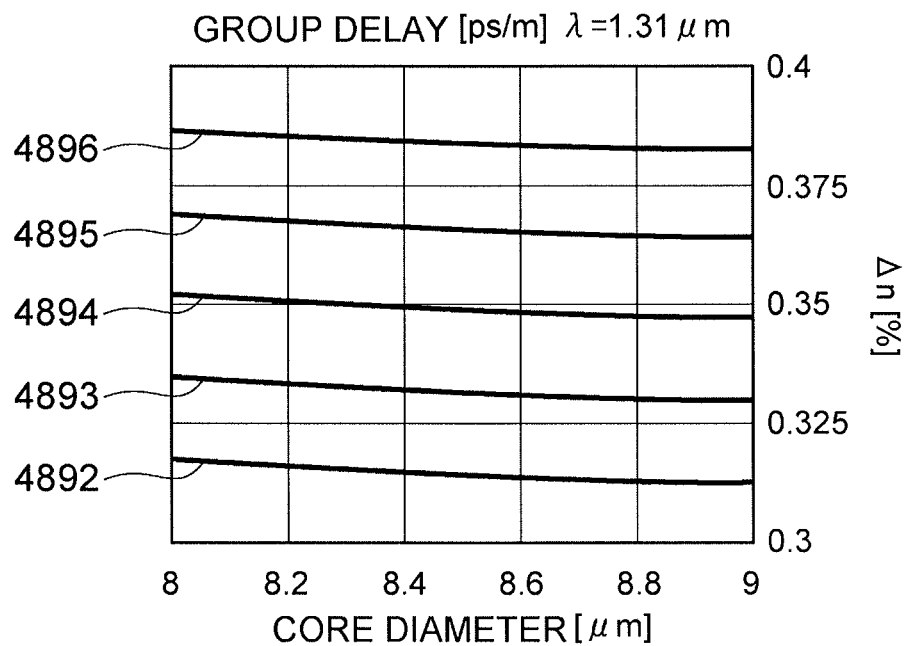
FIG. 3 is a graph showing the group delay (at a wavelength of 1.31 μm) with respect to the core diameter $2a$ and the refractive index difference $\Delta n$ in a first embodiment.
Figure 4:
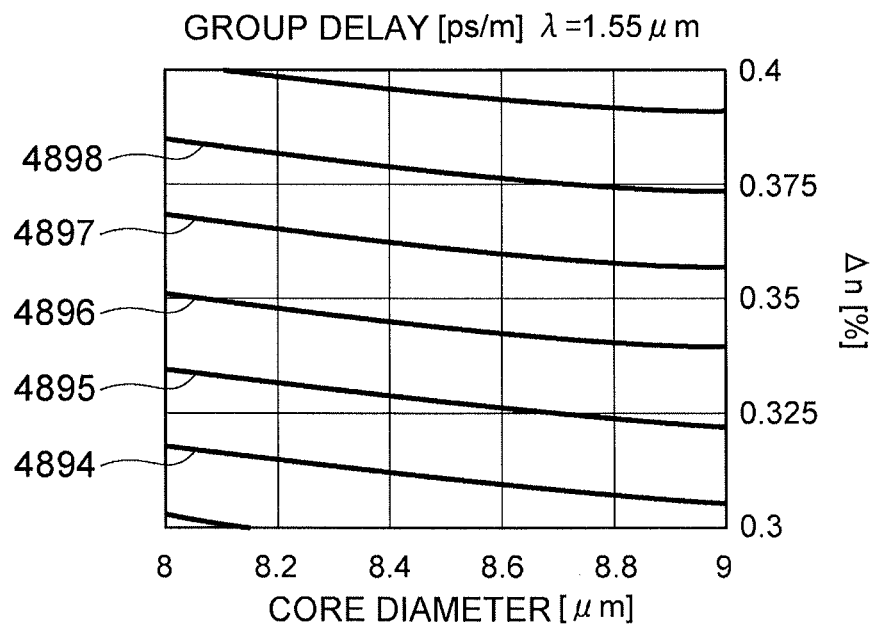
FIG. 4 is a graph showing the group delay (at a wavelength of 1.55 μm) with respect to the core diameter $2a$ and the refractive index difference $\Delta n$ in the first embodiment.
Figure 5:
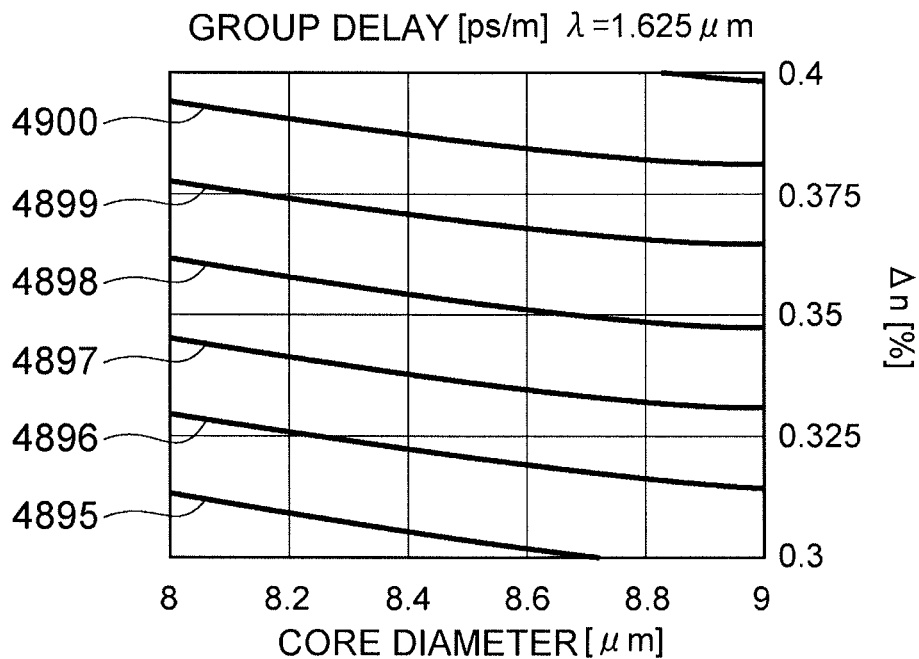
FIG. 5 is a graph showing the group delay (at a wavelength of 1.625 μm) with respect to the core diameter $2a$ and the refractive index difference $\Delta n$ in the first embodiment.

Each of FIGS. 3 to 5 is a graph showing the group delay with respect to the core diameter $2a$ and the refractive index difference $\Delta n$. FIGS. 3, 4, and 5 show cases in which the wavelength is 1.31 μm, 1.55 μm, and 1.625 μm, respectively. In these graphs, level lines of group delay are shown. The interval of the level lines is 1 ps/m.

Figure 6:
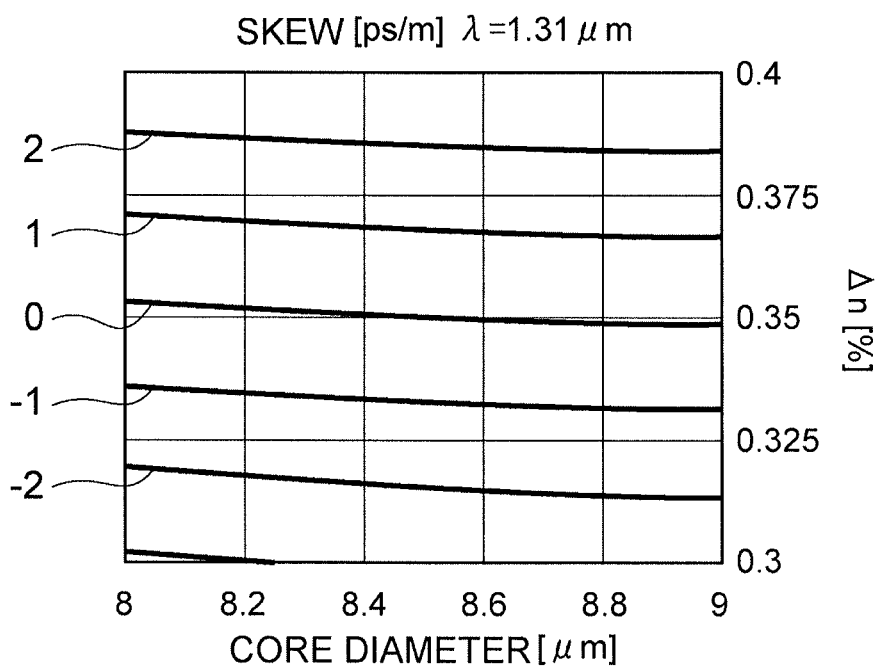
FIG. 6 is a graph showing the skew (at the wavelength of 1.31 μm) with respect to the core diameter 2a and the refractive index difference Δn in the first embodiment.
Figure 7:
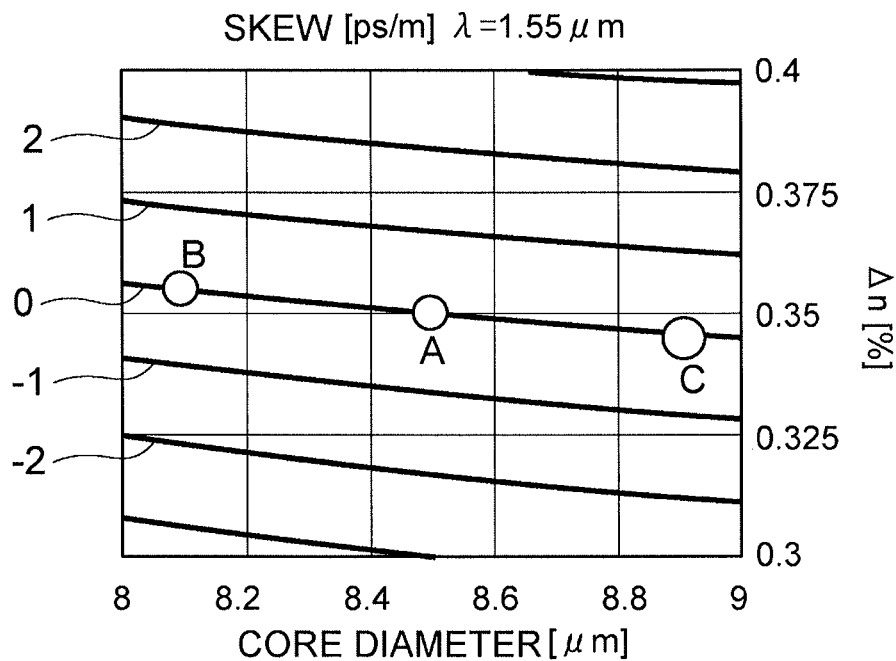
FIG. 7 is a graph showing the skew (at the wavelength of 1.55 μm) with respect to the core diameter 2a and the refractive index difference Δn in the first embodiment.
Figure 8:
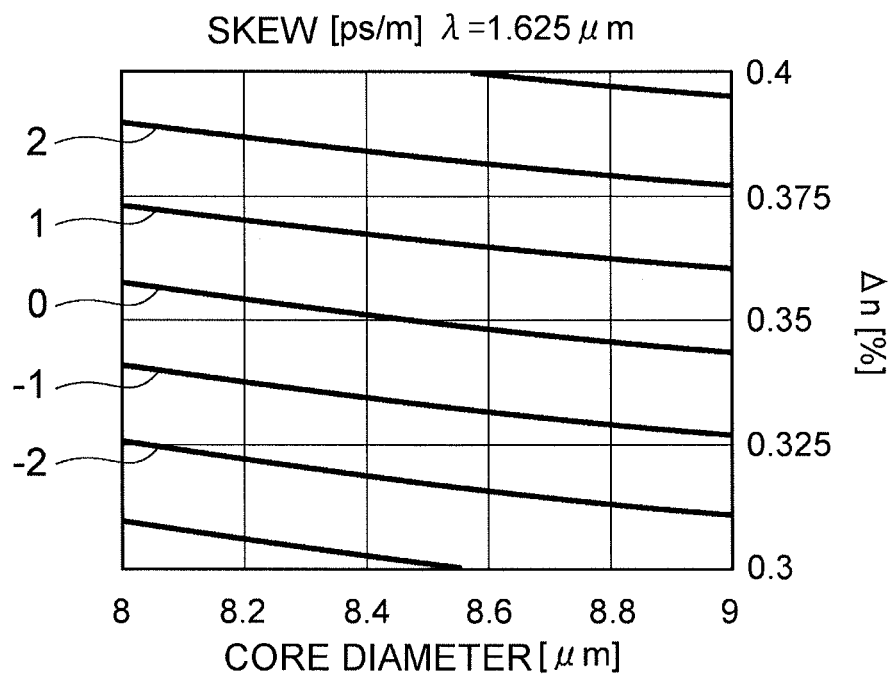
FIG. 8 is a graph showing the skew (at the wavelength of 1.625 μm) with respect to the core diameter 2a and the refractive index difference Δn in the first embodiment.

Each of FIGS. 6 to 8 is a graph showing the skew with respect to the core diameter $2a$ and the refractive index difference $\Delta n$. FIGS. 6, 7, and 8 show cases in which the wavelength is 1.31 μm, 1.55 and 1.625 respectively. In these graphs, level lines of skew are shown. The interval of the level lines is 1 ps/m. FIGS. 6 to 8 are obtained from FIGS. 3 to 5. The skew in each condition is obtained with reference to the group delay in the reference condition. As these graphs show, a skew occurs depending on the core diameter $2a$ and the refractive index difference $\Delta n$ even at any of the wavelengths (a skew is not zero).

Figure 9:
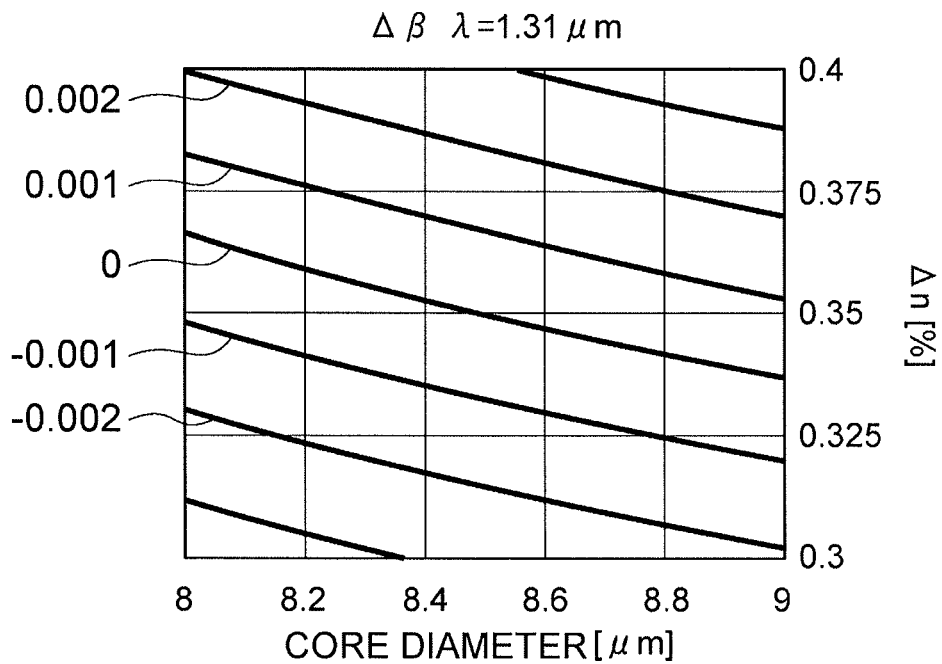
FIG. 9 is a graph showing the propagation constant difference (at the wavelength of 1.31 μm) with respect to the core diameter 2a and the refractive index difference Δn in the first embodiment.
Figure 10:
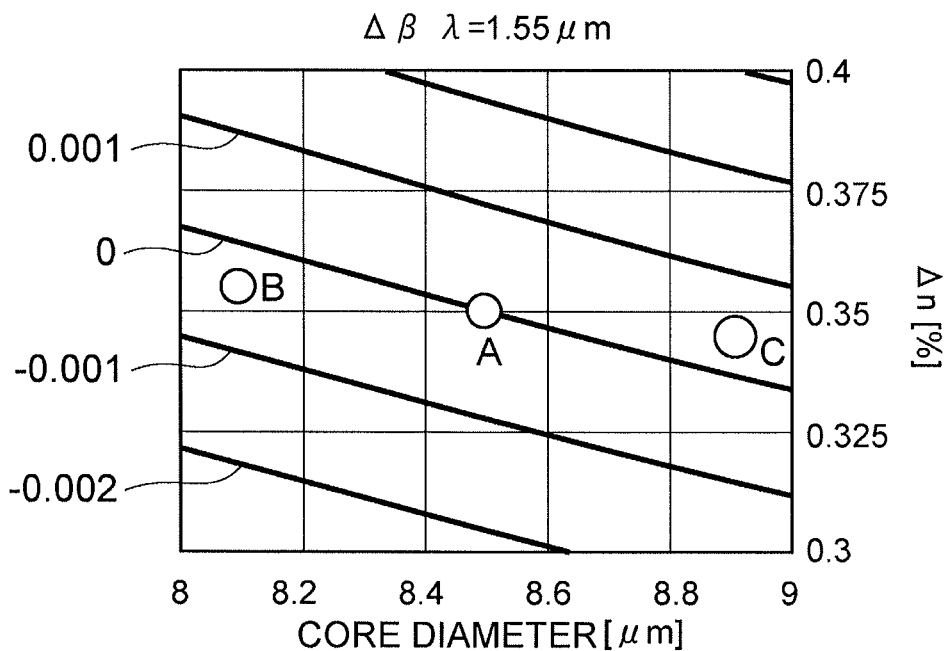
FIG. 10 is a graph showing the propagation constant difference (at the wavelength of 1.55 μm) with respect to the core diameter 2a and the refractive index difference Δn in the first embodiment.
Figure 11:
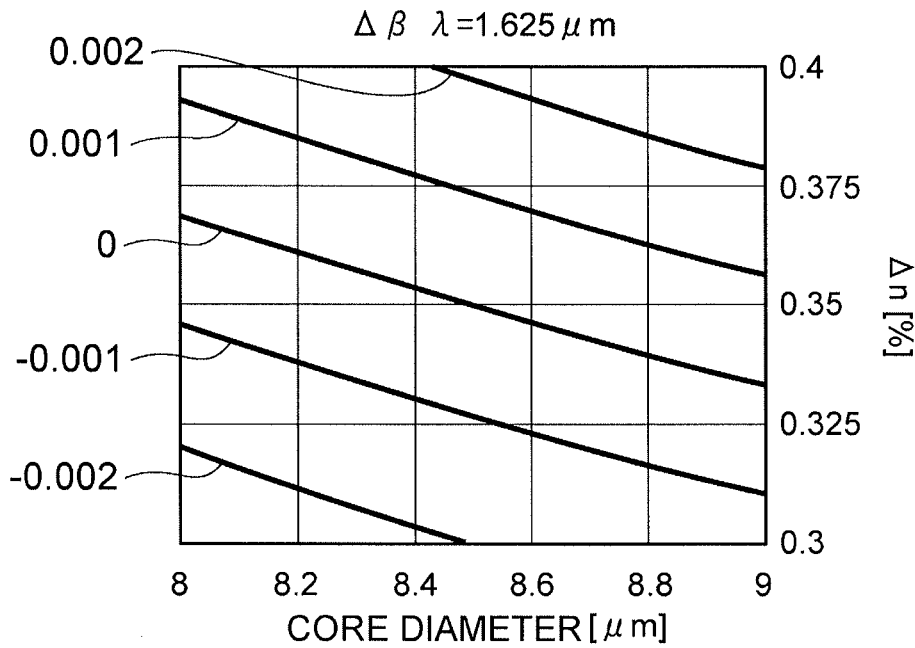
FIG. 11 is a graph showing the propagation constant difference (at the wavelength of 1.625 μm) with respect to the core diameter 2a and the refractive index difference Δn in the first embodiment.

Each of FIGS. 9 to 11 is a graph showing the propagation constant difference with respect to the core diameter $2a$ and the refractive index difference $\Delta n$. FIGS. 9, 10, and 11 show cases in which the wavelength is 1.31 μm, 1.55 μm, and 1.625 μm, respectively. In these graphs, level lines of propagation constant differences are shown. The interval of the level lines is 0.001/μm. The propagation constant difference in each condition is obtained with reference to the propagation constant in the reference condition.

In the first embodiment, the multi-core fiber is designed and produced so that the skew between the cores can be suppressed on the assumption that the propagation constant differs between the cores. For that purpose, in the multi-core fiber, group indices of light guided by the cores are made as equal as possible.

The multi-core fiber of the first embodiment can be produced by known production methods. For example, a plurality of core rods having different propagation constants are prepared. Each of the core rods includes a core provided at the center and containing $GeO_2$ and an optical cladding surrounding the core and containing no $GeO_2$. A plurality of core rods may be selected from different lots. Alternatively, a plurality of core rods may be prepared by dividing the same lot in the longitudinal direction, and the core rods may be subjected to elongation or peripheral grinding so as to form a difference in propagation constant.

To produce a multi-core fiber including refractive index depressed regions, as illustrated in FIG. 2, a plurality of core rods having different propagation constants are prepared. Each of the core rods includes a core provided at the center and containing $GeO_2$, an optical cladding surrounding the core and containing no $GeO_2$, and a refractive index depressed region surrounding the optical cladding and containing fluorine. The refractive index difference of the refractive index depressed region from that of the optical cladding is preferably −0.3% or less.

A jacket to surround these core rods is prepared. For example, a jacket material which is a columnar glass body having a plurality of holes extending in the longitudinal direction is produced. Core rods are inserted in and combined with the holes of the jacket material, so that an optical fiber preform is produced. Then, the optical fiber preform is drawn to produce a multi-core fiber.

Since the skew is a parameter determined by the total length of the multi-core fiber, it depends on a characteristic obtained by averaging variations in the longitudinal direction of the produced multi-core fiber. By applying a core diameter $2a$ and a refractive index difference $\Delta n$, which are calculated by averaging core diameters $2a$ and refractive index differences $\Delta n$ of the core in the longitudinal direction, to FIGS. 6 to 8, skews of the cores can be estimated. FIGS. 6 to 8 show that the skew does not change (or the skew change is small) as long as a specific change of a core structure (core diameter $2a$ and refractive index difference $\Delta n$).

To achieve a skew of 1 ps/m or less in the examples of FIGS. 6 to 8, the core diameter $2a$ and the refractive index difference $\Delta n$ need to be within an area between a level line where the skew is +1 ps/m and a level line where the skew is −1 ps/m. While a skew of 1 ps/m or less can be realized only by extremely finely managing the fiber length in an optical fiber ribbon, it can be easily realized in a multi-core fiber, for example, by the above-described production method. Crosstalk can also be reduced while the skew is within an acceptable range.

To suppress crosstalk, it is preferable to positively use heterogeneous cores. In this case, while all cores may be heterogeneous, it is satisfactory as long as two arbitrary adjacent cores are heterogeneous. A condition necessary for suppressing crosstalk is that the propagation constant is different between heterogeneous cores. Further, the crosstalk can decrease as the propagation constant difference increases.

As is clear from comparison with FIGS. 6 to 8 showing the relationship between the core structures and the skew and FIGS. 9 to 11 showing the relationship between the core structures and the propagation constant, the skew and the propagation constant change in different manners in response to the changes of the core structures. Therefore, by changing both the core diameter $2a$ and the refractive index difference $\Delta n$, the design can be made such that a difference in propagation constant is formed while the skew is kept in a predetermined range. To achieve both reduction of crosstalk and reduction of skew, parameters of heterogeneous cores are limited as follows.

In the first embodiment, a core $10_1$ located at the center is designated as type A, three cores $10_2$, $10_4$, and $10_6$ located on a circumference are designated as type B, and the other three cores $10_3$, $10_5$, and $10_7$ located on the circumference are designated as type C. The cores of types A, B, and C have different core structures. In this case, two arbitrary adjacent cores become heterogeneous. Specifically, the core of type A is set to have a diameter $2a$ of 8.5 μm and a refractive index difference $\Delta n$ of 0.35%. The cores of type B are set to have a diameter $2a$ of 8.1 μm and a refractive index difference $\Delta n$ of 0.355%. The cores of type C are set to have a diameter $2a$ of 8.9 μm and a refractive index difference $\Delta n$ of 0.345%.

Positions of the cores of types A to C are plotted in FIG. 7, which shows a skew at a wavelength of 1.55 μm. Positions of the cores of types A to C are also plotted in FIG. 10, which shows a propagation constant difference at the wavelength of 1.55 μm. As illustrated in FIG. 7, types A to C are located on a common skew level line at the wavelength of 1.55 µm, and the skew between the cores is 0.1 ps/m or less. In contrast, as illustrated in FIG. 10, the propagation constant difference between adjacent cores is 0.0003/µm or more at the wavelength of 1.55 µm. Hence, a level of propagation constant difference between the cores that cannot be obtained by production variations can be obtained while keeping a low skew between the cores. This reduces crosstalk.

The best core structural condition to achieve both low skew and low crosstalk can be quantitatively found from the skew change shown in FIGS. 6 to 8 and the propagation constant difference change shown in FIGS. 9 to 11 in response to the change of the core structure (core diameter $2a$ and refractive index difference $\Delta n$). First, according to FIG. 6, which shows a skew at the wavelength of 1.31 µm, a skew S at the wavelength of 1.31 µm is approximated by $$S=0.3916\times(2a)+57.22\times(\Delta n)-22.77 \quad (1a),$$

and, according to FIG. 9, which shows a propagation constant difference at the wavelength of 1.31 µm, a propagation constant difference $\Delta\beta$ at the wavelength of 1.31 µm is approximated by $$\Delta\beta=1.620\times10^{-3}\times(2a)+5.740\times10^{-2}\times(\Delta n)-3.386\times10^{-2} \quad (1b).$$

By designing the core diameter $2a$ and the refractive index difference $\Delta n$ from these equations so that the absolute value of the skew S becomes small and the absolute value of the propagation constant difference $\Delta\beta$ becomes large, a target property at the wavelength of 1.31 µm can be quantitatively estimated and realized. Here, a core structure change parameter $\Delta(\Delta n)/\Delta(2a)$ using a core diameter change amount ($\Delta(2a)$: unit µm) and a refractive index difference change amount ($\Delta(\Delta n)$: unit %) is defined. Thus, according to Eqs. 1a and 1b, at the wavelength of 1.31 µm, $\Delta(\Delta n)/\Delta(2a)=-0.55\times10^{-2}$ is preferable from a viewpoint of skew reduction, and $\Delta(\Delta n)/\Delta(2a)=-2.8\times10^{-2}$ should be avoided from a viewpoint of crosstalk reduction.

According to FIG. 7, which shows a skew at the wavelength of 1.55 µm, a skew S at the wavelength of 1.55 µm is approximated by $$S=0.7402\times(2a)+59.69\times(\Delta n)-27.22 \quad (2a),$$

and, according to FIG. 10, which shows a propagation constant difference at the wavelength of 1.55 µm, a propagation constant difference $\Delta\beta$ at the wavelength of 1.55 µm is approximated by $$\Delta\beta=1.505\times10^{-3}\times(2a)+4.448\times10^{-2}\times(\Delta n)-2.385\times10^{-2} \quad (2b).$$

According to Eqs. 2a and 2b, at the wavelength of 1.55 µm, $\Delta(\Delta n)/\Delta(2a)=-1.2\times10^{-2}$ is preferable from a viewpoint of skew reduction, and $\Delta(\Delta n)/\Delta(2a)=-3.4\times10^{-2}$ should be avoided from a viewpoint of crosstalk reduction.

According to FIG. 8, which shows a skew at the wavelength of 1.625 µm, a skew S at the wavelength of 1.625 µm is approximated by $$S=0.8865\times(2a)+60.41\times(\Delta n)-26.86 \quad (3a),$$

and, according to FIG. 11, which shows a propagation constant difference at the wavelength of 1.625 µm, a propagation constant difference $\Delta\beta$ at the wavelength of 1.625 µm is approximated by $$\Delta\beta=1.467\times10^{-3}\times(2a)+4.117\times10^{-2}\times(\Delta n)-3.386\times10^{-2} \quad (3b).$$

According to these equations, at the wavelength of 1.625 µm, $\Delta(\Delta n)/\Delta(2a)=-1.5\times10^{-2}$ is preferable from a viewpoint of skew reduction, and $\Delta(\Delta n)/\Delta(2a)=-3.6\times10^{-2}$ should be avoided from a viewpoint of crosstalk reduction.

By properly setting the core structure change parameter $\Delta(\Delta n)/\Delta(2a)$ while changing both the core diameter $2a$ and the refractive index difference $\Delta n$, as described above, the skew and the crosstalk can be both reduced. From a viewpoint of skew reduction, the core structure change parameter $\Delta(\Delta n)/\Delta(2a)$ preferably takes a negative value. Further, from a viewpoint of crosstalk reduction, the core structure change parameter $\Delta(\Delta n)/\Delta(2a)$ is preferably set at a lower limit according to the used wavelength so as to avoid the range of $-3.6\times10^{-2}$ to $-2.8\times10^{-2}$. Moreover, a low skew characteristic can be obtained within a communication wavelength range by setting the core structure change parameter $\Delta(\Delta n)/\Delta(2a)$ within the range of $-1.5\times10^{-2}$ to $-0.55\times10^{-2}$.

Second Embodiment

In a multi-core fiber according to a second embodiment, cores are formed of pure silica glass, optical claddings are formed of silica glass containing fluorine, and the propagation constant is different between two adjacent cores so as to suppress crosstalk. For the second embodiment, a skew and a propagation constant difference are also found as differences from those in the reference condition in which the core diameter $2a$ is 8.5 µm and the refractive index difference $\Delta n$ is 0.35%.

Figure 12:
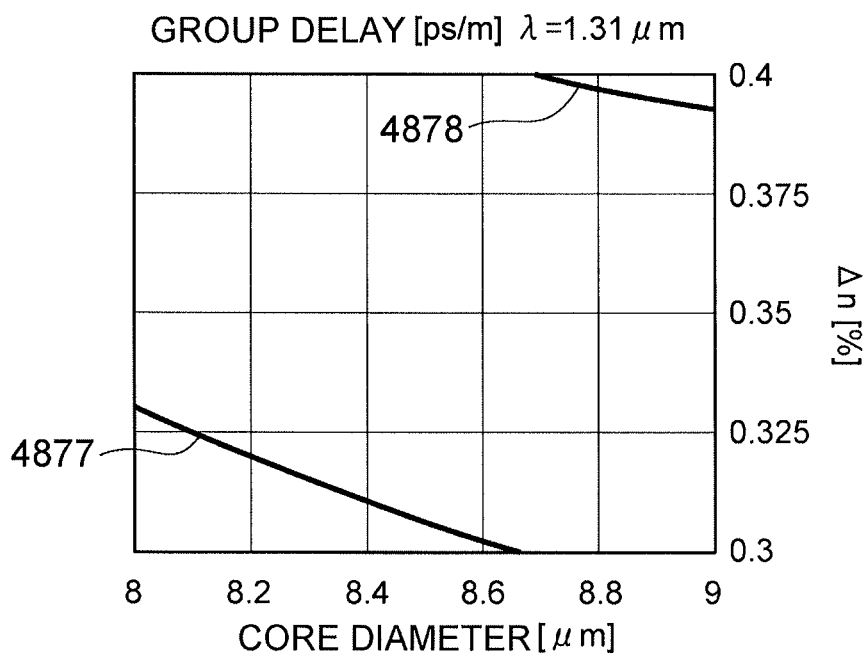
FIG. 12 is a graph showing the group delay (at a wavelength of 1.31 μm) with respect to the core diameter 2a and the refractive index difference Δn in a second embodiment.
Figure 13:
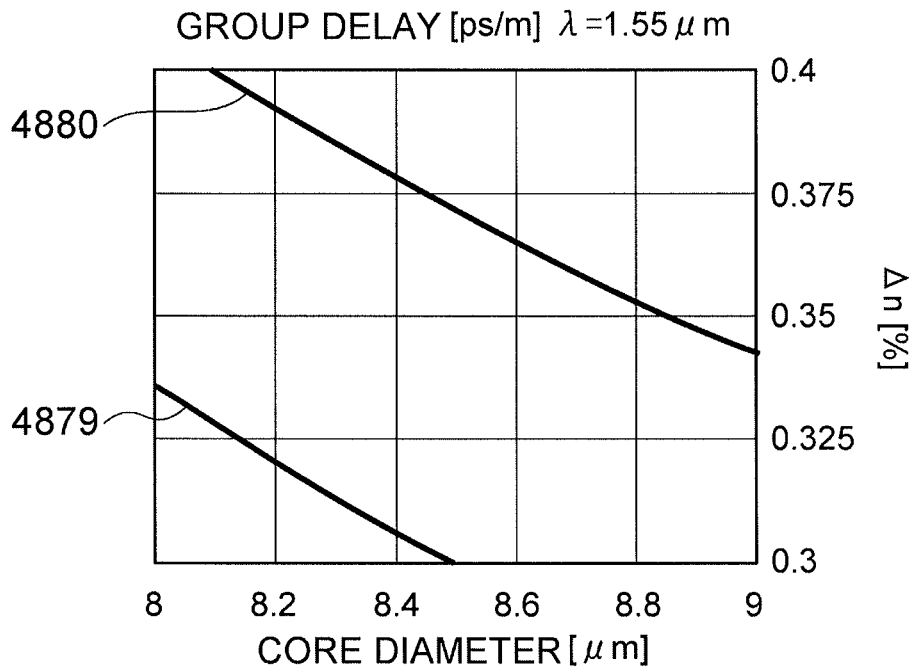
FIG. 13 is a graph showing the group delay (at a wavelength of 1.55 μm) with respect to the core diameter 2a and the refractive index difference Δn in the second embodiment.
Figure 14:
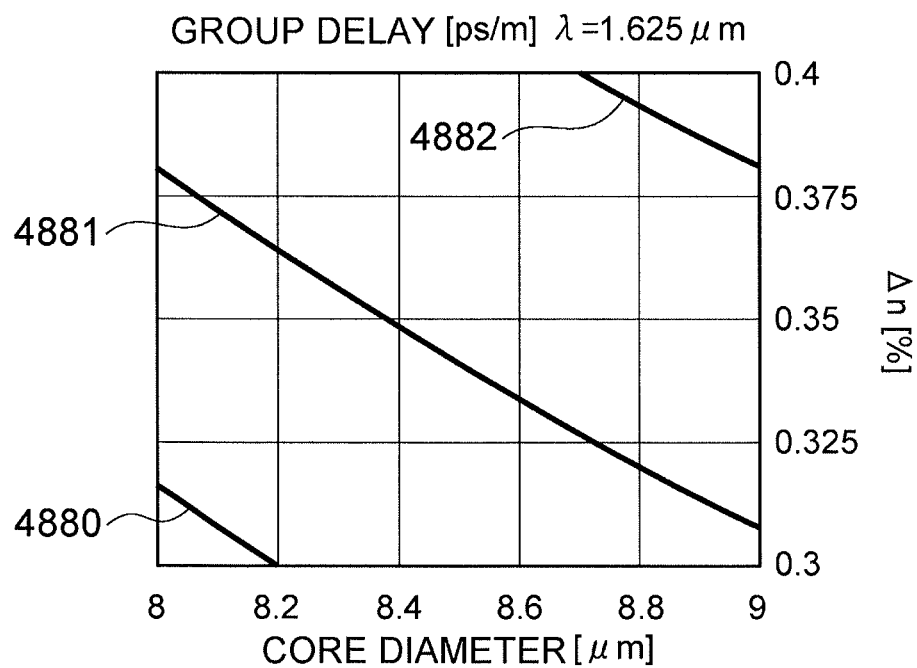
FIG. 14 is a graph showing the group delay (at a wavelength of 1.625 μm) with respect to the core diameter 2a and the refractive index difference Δn in the second embodiment.

Each of FIGS. 12 to 14 is a graph showing the group delay with respect to the core diameter $2a$ and the refractive index differences $\Delta n$. FIGS. 12, 13, and 14 illustrate cases in which the wavelength is 1.31 µm, 1.55 µm, and 1.625 µm, respectively. In these graphs, level lines of group delays are shown. The interval of the level lines is 1 ps/m.

Figure 15:
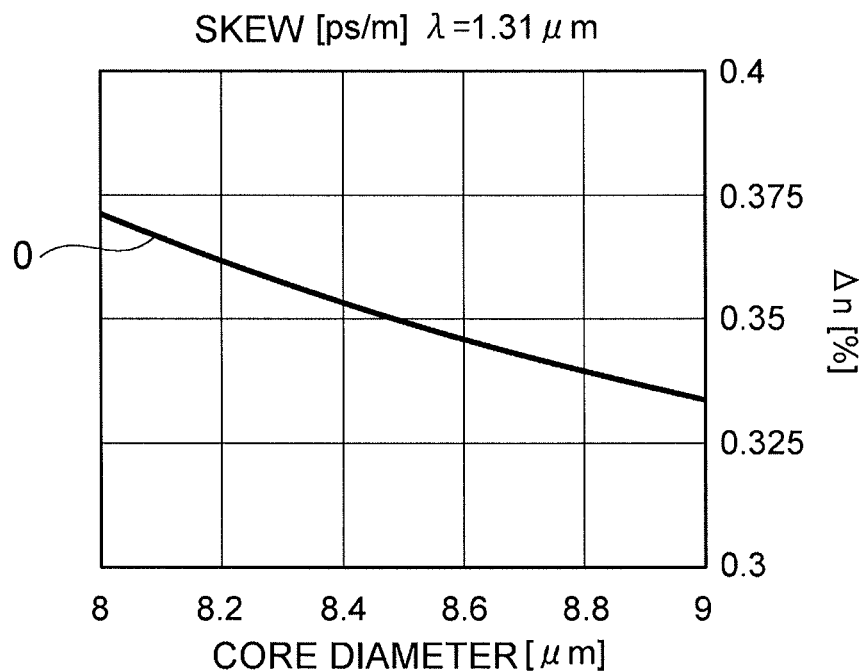
FIG. 15 is a graph showing the skew (at the wavelength of 1.31 μm) with respect to the core diameter 2a and the refractive index difference Δn in the second embodiment.
Figure 16:
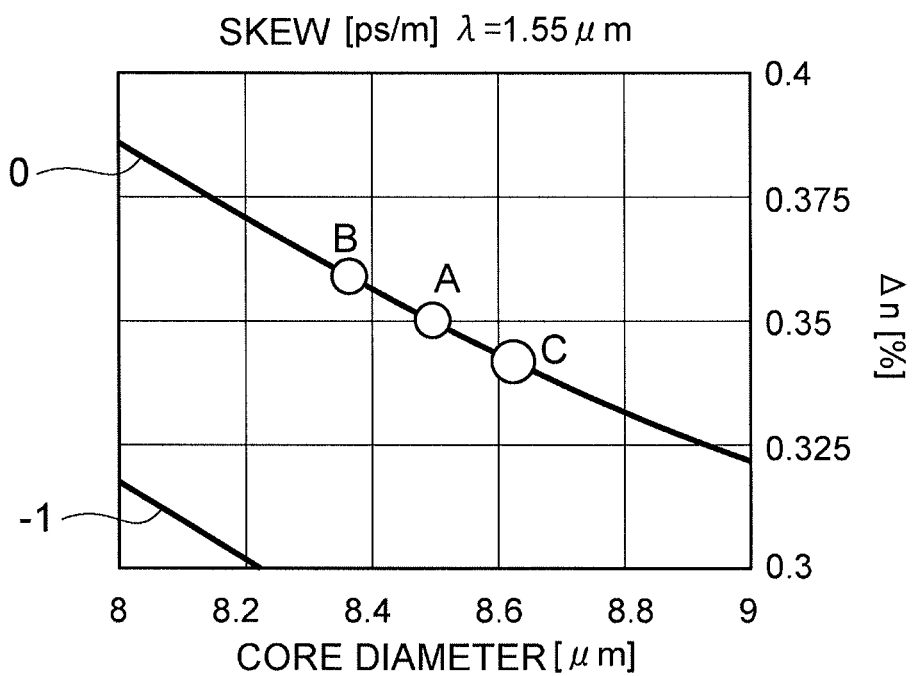
FIG. 16 is a graph showing the skew (at the wavelength of 1.55 μm) with respect to the core diameter 2a and the refractive index difference Δn in the second embodiment.
Figure 17:
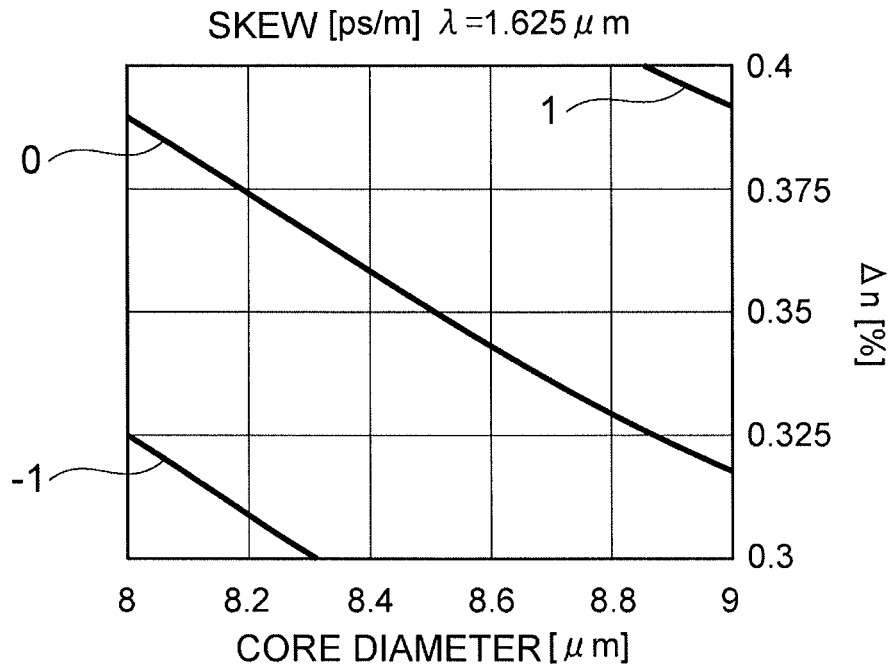
FIG. 17 is a graph showing the skew (at the wavelength of 1.625 μm) with respect to the core diameter 2a and the refractive index difference Δn in the second embodiment.

Each of FIGS. 15 to 17 is a graph showing the skew with respect to the core diameter $2a$ and the refractive index difference $\Delta n$. FIGS. 15, 16, and 17 illustrate cases in which the wavelength is 1.31 µm, 1.55 µm, and 1.625 µm, respectively. In these graphs, level lines of skews are shown. The interval of the level lines is 1 ps/m. FIGS. 15 to 17 are obtained from FIGS. 12 to 14. A skew in each condition is obtained with reference to the group delay in the reference condition. As is shown in these graphs, a skew occurs depending on the core diameter $2a$ and the refractive index difference $\Delta n$ at any of the wavelengths.

Figure 18:
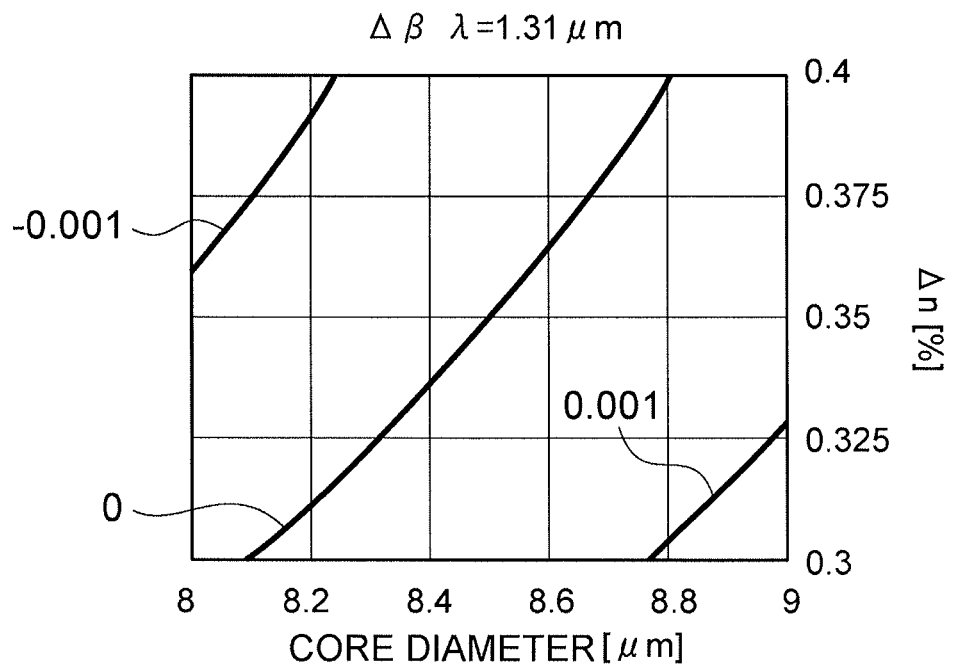
FIG. 18 is a graph showing the propagation constant difference (at the wavelength of 1.31 μm) with respect to the core diameter 2a and the refractive index difference Δn in the second embodiment.
Figure 19:
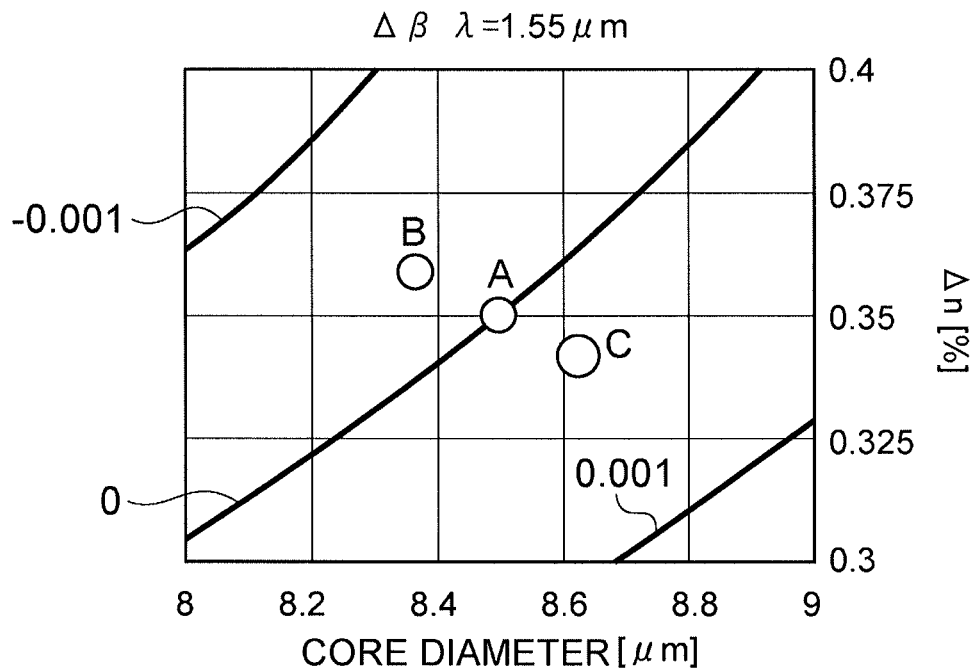
FIG. 19 is a graph showing the propagation constant difference (at the wavelength of 1.55 μm) with respect to the core diameter 2a and the refractive index difference Δn in the second embodiment.
Figure 20:
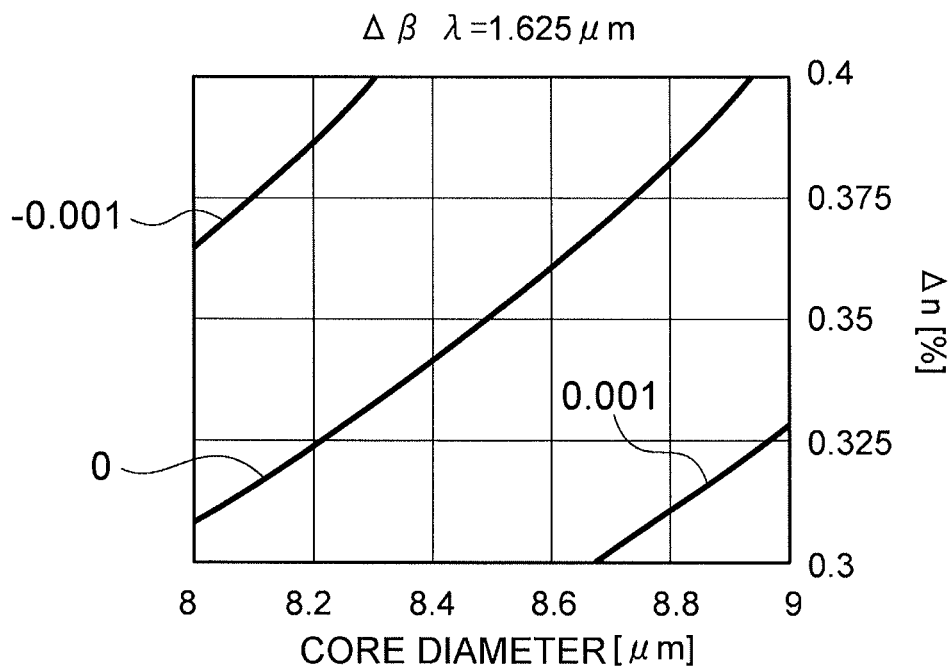
FIG. 20 is a graph showing the propagation constant difference (at the wavelength of 1.625 μm) with respect to the core diameter 2a and the refractive index difference Δn in the second embodiment.

Each of FIGS. 18 to 20 is a graph showing the propagation constant difference with respect to the core diameter $2a$ and the refractive index difference $\Delta n$. FIGS. 18, 19, and 20 illustrate cases in which the wavelength is 1.31 µm, 1.55 µm, and 1.625 µm, respectively. In these graphs, level lines of propagation constant differences are shown. The interval of the level lines is 0.001/µm. A propagation constant difference in each condition is obtained with reference to the group delay in the reference condition.

Comparing with the first embodiment, in the second embodiment, changes in skew and propagation constant difference in response to the core structure change in the same range are both reduced, and the dependence on the refractive index difference $\Delta n$ (vertical axis in the graph) is opposite in the relationship between the core structure and the propagation constant difference. Therefore, in the second embodiment in which the cores are formed of pure silica glass, the propagation constant difference is apt to change when the core structure is changed along the skew level line to maintain a constant skew.

In the second embodiment, a core $10_1$ located at the center is designated as type A, three cores $10_2$, $10_4$, and $10_6$ located on a circumference are designated as type B, and the other three cores $10_3$, $10_5$, and $10_7$ located on the circumference are designated as type C. The cores of types A, B, and C have different core structures. This makes two arbitrary adjacent cores heterogeneous. Specifically, the core of type A has a diameter $2a$ of 8.5 μm and a refractive index difference $\Delta n$ of 0.35%. The cores of type B have a diameter $2a$ of 8.35 μm and a refractive index difference $\Delta n$ of 0.36%. The cores of type C have a diameter $2a$ of 8.65 μm and a refractive index difference $\Delta n$ of 0.34%.

In FIG. 16, which shows a skew at a wavelength of 1.55 μm, positions of the cores of types A to C are plotted. In FIG. 19, which shows a propagation constant difference at a wavelength of 1.55 μm, positions of the cores of types A to C are also plotted. As illustrated in FIG. 16, the cores of types A to C are located on a common skew level line at the wavelength of 1.55 μm, and the skew between the cores is 0.1 ps/m or less. In contrast, as illustrated in FIG. 19, the propagation constant difference between the adjacent cores is 0.0003/μm or more at the wavelength of 1.55 μm. Hence, a level of propagation constant difference between the cores that cannot be obtained by production variations can be obtained while keeping a low skew between the cores. This reduces crosstalk.

In the second embodiment, the best core structural condition to achieve both low skew and low crosstalk can also be quantitatively found from the skew change shown in FIGS. 15 to 17 and the propagation constant difference change shown in FIGS. 18 to 20 in response to the change of core structures (core diameter $2a$ and refractive index difference $\Delta n$). According to FIG. 15, which shows a skew at the wavelength of 1.31 μm, a skew S at the wavelength of 1.31 μm is approximated by $$S = 0.3195 \times (2a) + 10.29 \times (\Delta n) - 6.964 \quad (4a),$$

and, according to FIG. 18, which shows a propagation constant difference at the wavelength of 1.31 μm, a propagation constant difference $\Delta \beta$ at the wavelength of 1.31 μm is approximated by $$\Delta \beta = 1.595 \times 10^{-3} \times (2a) - 1.145 \times 10^{-2} \times (\Delta n) - 0.954 \times 10^{-2} \quad (4b).$$

According to these equations, at the wavelength of 1.31 μm, $\Delta(\Delta n)/\Delta(2a) = -3.8 \times 10^{-2}$ is preferable from a viewpoint of skew reduction, and $\Delta(\Delta n)/\Delta(2a) = +0.14$ should be avoided from a viewpoint of crosstalk reduction.

According to FIG. 16, which shows a skew at the wavelength of 1.55 μm, a skew S at the wavelength of 1.55 μm is approximated by $$S = 0.8818 \times (2a) + 13.52 \times (\Delta n) - 12.27 \quad (5a),$$

and, according to FIG. 19, which shows a propagation constant difference at the wavelength of 1.55 μm, a propagation constant difference $\Delta \beta$ at the wavelength of 1.55 μm is approximated by $$\Delta \beta = 1.458 \times 10^{-3} \times (2a) - 1.408 \times 10^{-2} \times (\Delta n) - 0745 \times 10^{-2} \quad (5b).$$

According to these equations, at the wavelength of 1.55 μm, $\Delta(\Delta n)/\Delta(2a) = -6.5 \times 10^{-2}$ is preferable from a viewpoint of skew reduction, and $\Delta(\Delta n)/\Delta(2a) = +0.10$ should be avoided from a viewpoint of crosstalk reduction.

According to FIG. 17, which shows a skew at the wavelength of 1.625 μm a skew S at the wavelength of 1.625 μm is approximated by $$S = 1.054 \times (2a) + 14.41 \times (\Delta n) - 14.05 \quad (6a),$$

and, according to FIG. 20, which shows a propagation constant difference at the wavelength of 1.625 μm, a propagation constant difference $\Delta \beta$ at the wavelength of 1.625 μm is approximated by $$\Delta \beta = 1.404 \times 10^{-3} \times (2a) - 1.485 \times 10^{-2} \times (\Delta n) - 0.672 \times 10^{-2} \quad (6b).$$

According to these equations, at the wavelength of 1.625 μm, $\Delta(\Delta n)/\Delta(2a) = -7.3 \times 10^{-2}$ is preferable from a viewpoint of skew reduction, and $\Delta(\Delta n)/\Delta(2a) = +0.095$ should be avoided from a viewpoint of crosstalk reduction.

In the second embodiment, by properly setting the core structure change parameter $\Delta(\Delta n)/\Delta(2a)$ while changing both the core diameter $2a$ and the refractive index difference $\Delta n$, the skew and the crosstalk can also be both reduced. From a viewpoint of skew reduction and crosstalk reduction, the core structure change parameter $\Delta(\Delta n)/\Delta(2a)$ preferably takes a negative value. Moreover, a low skew characteristic can be obtained within a communication wavelength range by setting the core structure change parameter $\Delta(\Delta n)/\Delta(2a)$ within the range of $-7.3 \times 10^{-2}$ to $-3.8 \times 10^{-2}$.

The second embodiment is also superior to the first embodiment in low latency. Referring to the group delay changes shown in FIGS. 3 to 5 in the first embodiment (the core structure containing $GeO_2$), in the illustrated core structure range, the group delay is within the range of 4891 to 4897 ps/m at the wavelength of 1.31 μm, the range of 4893 to 4900 ps/m at the wavelength of 1.55 μm, and the range of 4894 to 4901 ps/m at the wavelength of 1.625 μm. In contrast, referring to the group delays changes shown in FIGS. 12 to 14 in the second embodiment (cores are formed of pure silica), in the illustrated core structure range, the group delay is within the range of 4877 to 4878 ps/m at the wavelength of 1.31 μm, the range of 4878 to 4881 ps/m at the wavelength of 1.55 μm, and the range of 4880 to 4882 ps/m at the wavelength of 1.625 μm. The delay is lower by about 14 to 19 ps/m in the second embodiment. Thus, the second embodiment is favorable to construction of a transfer system characterized in low latency.

Third Embodiment

The method of the first or second embodiment can reduce the skew of the multi-core fiber itself. However, particular when the length of the multi-core fiber is long, it is assumed that a finite value of skew may accumulate and remain. Further, it is assumed that a skew, which is not predicted by the fiber state, may occur depending on a cable forming process and a laying state. In a third embodiment, the skew is reduced by pigtail fibers attached to a multi-core fiber.

Figure 21:
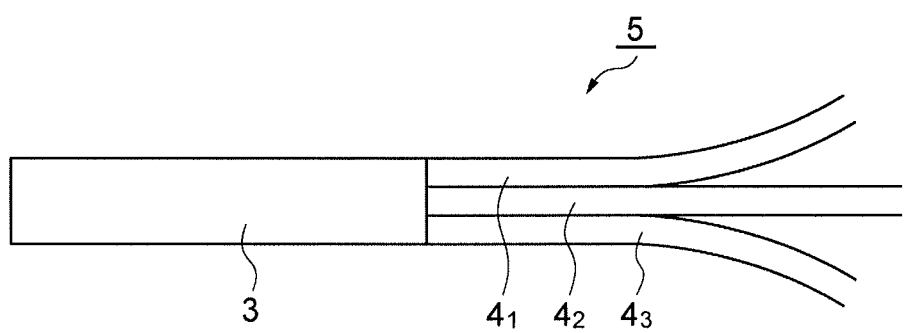
FIG. 21 is a conceptual view of an optical cable for parallel optical transmission according to a third embodiment.

FIG. 21 is a conceptual view illustrating a structure of an optical cable 5 for parallel optical transmission according to the third embodiment. The optical cable 5 for parallel optical transmission includes a multi-core fiber 3 including a plurality of cores extending along a fiber axis, and pigtail optical fibers $4_1$ to $4_3$ optically connected to the cores of the multi-core fiber 3. The pigtail optical fibers $4_1$ to $4_3$ are optically connected at one end to the cores of the multi-core fiber 3, and are separated at the other end into single cores. The skew of the multi-core fiber 3 is compensated by adjusting the length of separated portions of the pigtail optical fibers $4_1$ to $4_3$, and the total skew of the optical cable 5 is 0.1 ps/m or less.

The pigtail optical fibers $4_1$ to $4_3$ also serve to introduce and pick up an optical signal into and from a specific core in the multi-core fiber 3. On a multi-core fiber 3 side, the pigtail optical fibers $4_1$ to $4_3$ are put together in an arrangement pattern corresponding to the cores in the multi-core fiber 3. On the opposite side, the pigtail optical fibers $4_1$ to $4_3$ are separated into single optical fibers. The multi-core fiber 3 and the pigtail optical fibers $4_1$ to $4_3$ are connected to each other by a connector or by fusion splicing.

The pigtail optical fibers $4_1$ to $4_3$ have a waveguide structure with a core and a cladding similar to that of a general optical fiber, and give a delay of about 4.9 ns per meter in length. Hence, the total skew of the optical cable 5 can be reduced by adjusting the length of the pigtail optical fibers $4_1$ to $4_3$ at the separated portions.

For example, when the multi-core fiber 3 having a skew of about 0.2 ps/m is 10 km in length, a skew of about 2 ns occurs in the multi-core fiber 3. In this case, the skew can be substantially removed by changing the length of the separated portions of the pigtail optical fibers $4_1$ to $4_3$ by up to about 0.41 m (giving a comparatively short pigtail length to a core that provides a large delay). Further, in the third embodiment, not only the skew of the optical cable 5 but also the total skew of the transmission system can be adjusted by adjusting the length of the pigtail optical fibers while checking the actual skew.

What is claimed is:

1. A multi-core fiber comprising:
a plurality of cores extending along a fiber axis, each of the plurality of cores having a refractive index difference $\Delta n$ and a diameter $2a$; and
optical claddings surrounding the plurality of cores, and having a core structure change parameter $\Delta(\Delta n)/\Delta(2a)$ being out of a range of $-3.6 \times 10^{-2}$ to $-2.8 \times 10^{-2}$, wherein $\Delta(\Delta n)$ representing a change amount of the refractive index difference between the cores and is expressed by percent and $\Delta(2a)$ representing a change amount of the diameter between the cores and is expressed by micrometer, and
wherein a skew between optical signals propagating through the plurality of cores is 1 ps/m or less, and
wherein a propagation constant difference between two adjacent cores of the plurality of cores is more than 0.

2. The multi-core fiber according to claim 1,
wherein both the refractive index difference and the diameter are different between the two adjacent cores of the plurality of cores, and
wherein the skew between the optical signals propagating through the plurality of cores is less than a skew realized in a case where the diameter is equal and the refractive index difference is different between the cores and a skew realized in a case where the refractive index difference is equal and the diameter is different between the cores.

3. The multi-core fiber according to claim 1,
wherein both the refractive index difference and the diameter are different between the two adjacent cores of the plurality of cores, and
wherein the core structure change parameter $\Delta(\Delta n)/\Delta(2a)$ is negative.

4. The multi-core fiber according to claim 2,
wherein the propagation constant difference between the two adjacent cores of the plurality of cores is $0.0003/\mu m$ or more, and
wherein the skew between the optical signals propagating through the plurality of cores is 0.1 ps/m or less.

5. The multi-core fiber according to claim 3,
wherein the propagation constant difference between the two adjacent cores of the plurality of cores is $0.0003/\mu m$ or more, and
wherein the skew between the optical signals propagating through the plurality of cores is 0.1 ps/m or less.

6. The multi-core fiber according to claim 2,
wherein the plurality of cores are formed of pure silica glass, and
wherein the optical claddings are formed of silica glass containing fluorine.

7. The multi-core fiber according to claim 3,
wherein the plurality of cores are formed of pure silica glass, and
wherein the optical claddings are formed of silica glass containing fluorine.

8. The multi-core fiber according to claim 3,
wherein the plurality of cores are formed of silica glass containing $GeO_2$, and
wherein the core structure change parameter $\Delta(\Delta n)/\Delta(2a)$ is within a range of $-1.5 \times 10^{-2}$ to $-0.5 \times 10^{-2}$.

9. The multi-core fiber according to claim 3,
wherein the plurality of cores are formed of pure silica glass,
wherein the optical claddings are formed of silica glass containing fluorine, and
wherein the core structure changes parameter $\Delta(\Delta n)/\Delta(2a)$ is within a range of $-7.3 \times 10^{-2}$ to $-3.8 \times 10^{-2}$.

10. The multi-core fiber according to claim 1,
wherein the plurality of cores are formed of pure silica glass,
wherein the optical claddings are formed of silica glass containing fluorine, and
wherein the skew between the optical signals propagating through the plurality of cores is 0.5 ps/m or less.

11. The multi-core fiber according to claim 1,
wherein a refractive index depressed region having a refractive index lower than a refractive index of the optical claddings is provided between the two adjacent cores of the plurality of cores.

12. An optical cable for parallel optical transmission comprising:
a multi-core fiber including a plurality of cores extending along a fiber axis and optical claddings surrounding the plurality of cores; and
pigtail optical fibers optically connected to the cores of the multi-core fiber,
wherein the pigtail optical fibers are optically connected at one end to the cores of the multi-core fiber, and are separated into single cores at the other end,
wherein the skew of the multi-core fiber is compensated by connecting, to the core of the plurality of cores that provides a comparatively large delay, the pigtail optical fiber of the pigtail optical fibers whose separated portion at the other end is comparatively short, and
wherein the total skew of the optical cable is 0.1 ps/m or less.

* * * * *